(12) United States Patent
Tyurin et al.

(10) Patent No.: US 7,342,959 B2
(45) Date of Patent: Mar. 11, 2008

(54) METHOD AND SYSTEM FOR ADAPTIVE PREFILTERING OF A SIGNAL FOR TRANSMISSION

(75) Inventors: Michail F. Tyurin, Nizhny Novgorod (RU); Alexey A. Varyzgin, Nizhny Novgorod (RU); Alexander Y. Aseev, Nizhny Novgorod (RU)

(73) Assignee: Intel Corporation, Santa Clara, CA (US)

(*) Notice: Subject to any disclaimer, the term of this patent is extended or adjusted under 35 U.S.C. 154(b) by 745 days.

(21) Appl. No.: 10/746,894

(22) Filed: Dec. 23, 2003

(65) Prior Publication Data

US 2005/0135469 A1    Jun. 23, 2005

(51) Int. Cl.
*H03H 7/30* (2006.01)
(52) U.S. Cl. ............................................. 375/232
(58) Field of Classification Search .......... 375/229, 375/230, 232, 219, 316, 346
See application file for complete search history.

(56) References Cited

U.S. PATENT DOCUMENTS

| | | |
|---|---|---|
| 4,969,162 A | 11/1990 | Karr |
| 5,267,266 A * | 11/1993 | Chen ...................... 375/232 |

FOREIGN PATENT DOCUMENTS

| | | |
|---|---|---|
| WO | WO 00/16526 | 3/2000 |
| WO | WO00/16526 * | 3/2000 |
| WO | PCT/US2004/041916 | 5/2005 |

* cited by examiner

*Primary Examiner*—Kevin Burd
(74) *Attorney, Agent, or Firm*—Blakely, Sokoloff, Taylor & Zafman LLP

(57) ABSTRACT

A method and system for adaptive prefiltering of a signal for transmission is described. The method includes determining a reference starting value of coefficients for a receiver equalizer filter, receiving an indication of a change in channel characteristics based on a signal received at the receiver equalizer filter, computing coefficients for an adaptive filter based on the reference starting value and the change in channel characteristics, setting the coefficients of the adaptive filter equal to the computed coefficients, and filtering a signal for transmission through the adaptive filter.

2 Claims, 3 Drawing Sheets

METHOD AND SYSTEM FOR ADAPTIVE PREFILTERING OF A SIGNAL FOR TRANSMISSION

BACKGROUND

1. Technical Field

Embodiments of the invention relate to the field of signal filtering, and more specifically to adaptive prefiltering of a signal for transmission.

2. Background Information and Description of Related Art

Signals received at a communication channel are often filtered by an equalizer filter and then transmitted. When channel characteristics change, the equalizer filter at the receive side may be updated for these changes. However, these changes are not tracked on the transmission side. Therefore, transmitted signals may become corrupted when channel characteristics change.

BRIEF DESCRIPTION OF DRAWINGS

The invention may best be understood by referring to the following description and accompanying drawings that are used to illustrate embodiments of the invention. In the drawings.

DETAILED DESCRIPTION

Embodiments of a system and method for adaptive prefiltering of a signal for transmission are described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
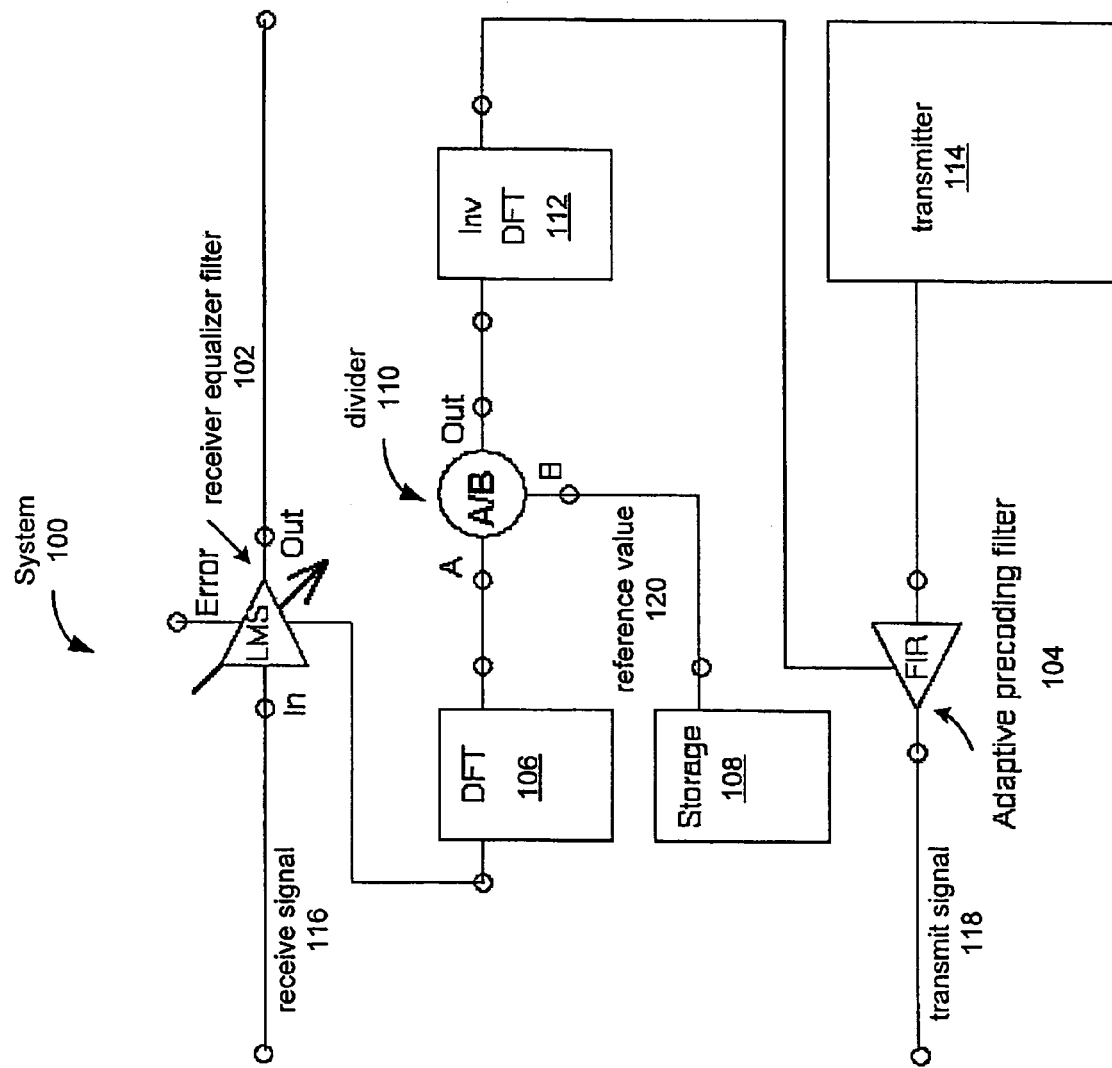
FIG. 1 is a block diagram illustrating one generalized embodiment of a system incorporating the invention in a frequency domain.

Referring to FIG. 1, a block diagram illustrates a system 100 in the frequency domain according to one embodiment of the invention. Those of ordinary skill in the art will appreciate that the system 100 may include more components than those shown in FIG. 1. However, it is not necessary that all of these generally conventional components be shown in order to disclose an illustrative embodiment for practicing the invention.

System 100 includes a receiver equalizer filter 102 to filter a received signal 116, and an adaptive filter 104 to filter a signal 118 for transmission. In one embodiment, the receiver equalizer filter 102 is a Least Means Square (LMS) filter.

System 100 also includes a correction element to determine a change in channel characteristics based on the received signal and set one or more coefficients of the adaptive filter to adapt to the change in channel characteristics. The correction element may include one or more Discrete Fourier Transform (DFT) components, such as 106 or 112, to perform Fourier transforms of coefficients of the filters, a storage element 108 to store one or more reference coefficient values 120, and a divider 110.

Initially, one or more reference coefficient values equal to the coefficients of the receiver equalizer filter 102 in a beginning state are stored in storage element 108. In one embodiment, the adaptive filter 104 is set to an initial state with a center coefficient or tap equal to a unit value (or one), and other coefficients or taps equal to zero. When channel characteristics change, corrected coefficients for the adaptive filter 104 are computed by the correction element based on the reference values and the change in channel characteristics.

The change in channel characteristics may be determined based on the received signal 116. Typically, when a received signal indicates a change in channel characteristics, the coefficients of the receiver equalizer filter 102 will adapt to the change. Therefore, the correction element may use the new coefficients of the receiver equalizer filter to adapt the adaptive filter 104 to the change in channel characteristics.

In one embodiment, the correction element performs, via DFT component 106, a Fourier transform of the current coefficients of the receiver equalizer filter 102. Divider 110 is then used to divide the output of DFT component 106 by the stored reference value 120. This quotient determined by divider 110 is then input into an inverse DFT component 112, which performs an inverse Fourier transform on the quotient. The output of the inverse DFT component may then be used to set the coefficients of the adaptive filter 104. This adapts the adaptive filter 104 to the new channel characteristics, so signals transmitted by transmitter 114 may be correctly filtered by adaptive filter 104.

Figure 2:
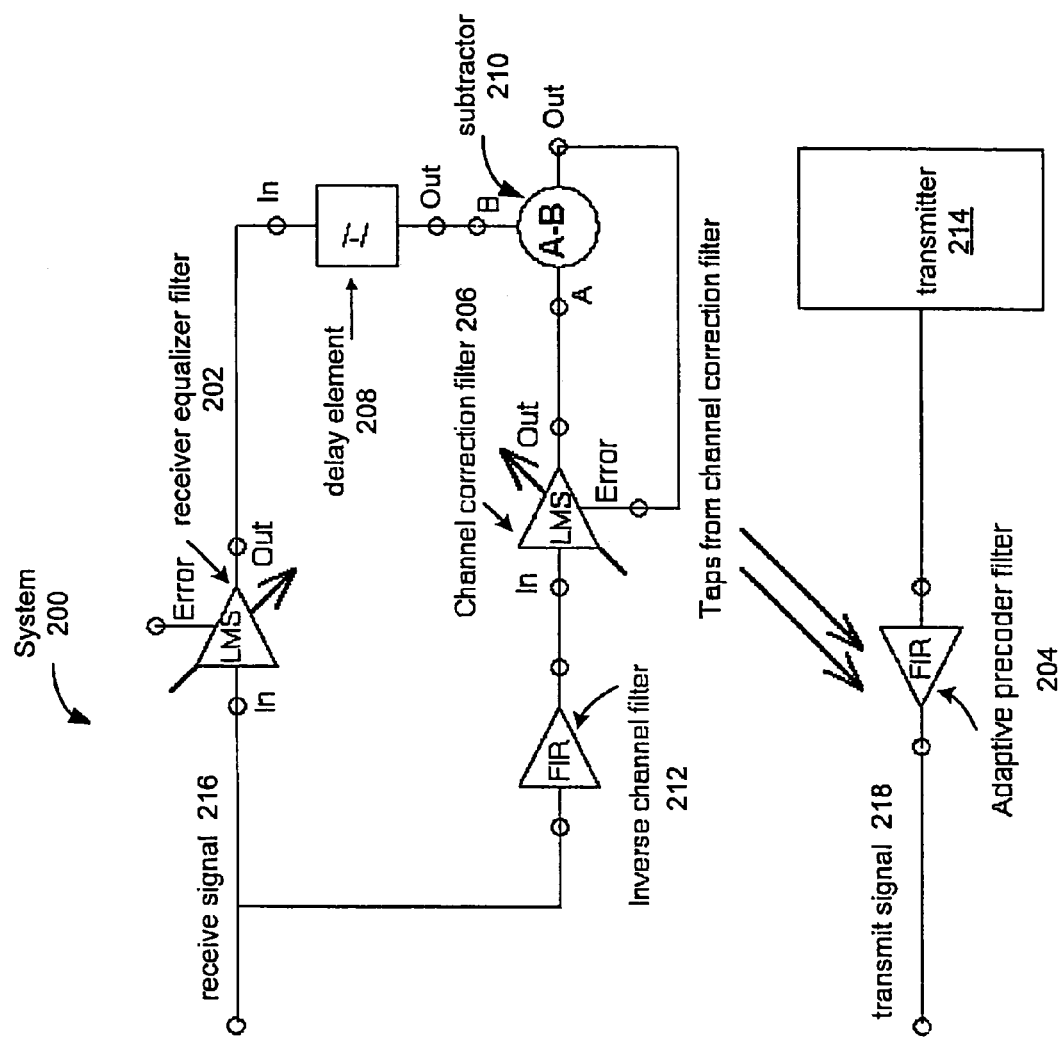
FIG. 2 is a block diagram illustrating another generalized embodiment of a system incorporating the invention in a time domain.

FIG. 2 is a block diagram illustrating a system 200 in the time domain according to one embodiment of the invention. System 200 includes a receiver equalizer filter 202 to filter a received signal 216, and an adaptive filter 204 to filter a signal 218 for transmission. In one embodiment, the receiver equalizer filter 202 is a Least Means Square (LMS) filter. System 200 also includes a correction element to determine a change in channel characteristics based on the received signal and set one or more coefficients of the adaptive filter to adapt to the change in channel characteristics. The correction element may include an inverse channel filter 212 to filter the received signal 216, a channel correction filter 206 to filter the output of the inverse channel filter 212 and to determine the coefficients of the adaptive filter 204, a delay element 208 to delay the output of the receiver equalizer filter 202, and a subtractor 210 to determine a difference between the output of the channel correction filter 206 and the delayed output of the receiver equalizer filter 202.

Initially, the coefficients of the inverse channel filter 212 are set to equal the coefficients of the receiver equalizer filter 202 in a beginning state. In one embodiment, the adaptive filter 104 and the channel correction filter 206 are both set to initial states, where each filter has a center coefficient or tap equal to a unit value (or one), and other coefficients or taps equal to zero. When a received signal indicates a change in channel characteristics, the coefficients of the receiver equalizer filter 102 will adapt to the change. Therefore, the correction element may use the new coefficients of the receiver equalizer filter to adapt the adaptive filter 104 to the change in channel characteristics.

The received signal 216 is filtered by inverse channel filter 212. The output of the inverse channel filter 212 is then filtered by channel correction filter 206. A delay element 208 delays the output of the receiver equalizer filter 202 to match the output of the channel correction filter 206 in time. A subtracting element 210 is used to determine a difference between the output of the channel correction filter 206 and the delayed output of the receiver equalizer filter 202. This difference determined by subtracting element 210 may be used to correct the coefficients of channel correction filter 206. In one embodiment, the process of filtering by channel correction filter 206, computing a difference between the output of the channel correction filter 206 and the delayed output of the receiver equalizer filter 202, and correcting the coefficients of channel correction filter 206 based on the computed difference may be performed iteratively. In one embodiment, this iterative process is performed until the computed difference is close to or equal to zero.

After the coefficients of the channel correction filter 206 have been updated or corrected, the coefficients of the adaptive filter 204 may be set to equal the coefficients of the channel correction filter 206. This adapts the adaptive filter 204 to the new channel characteristics, so signals transmitted by transmitter 214 may be correctly filtered by adaptive filter 204.

Figure 3:
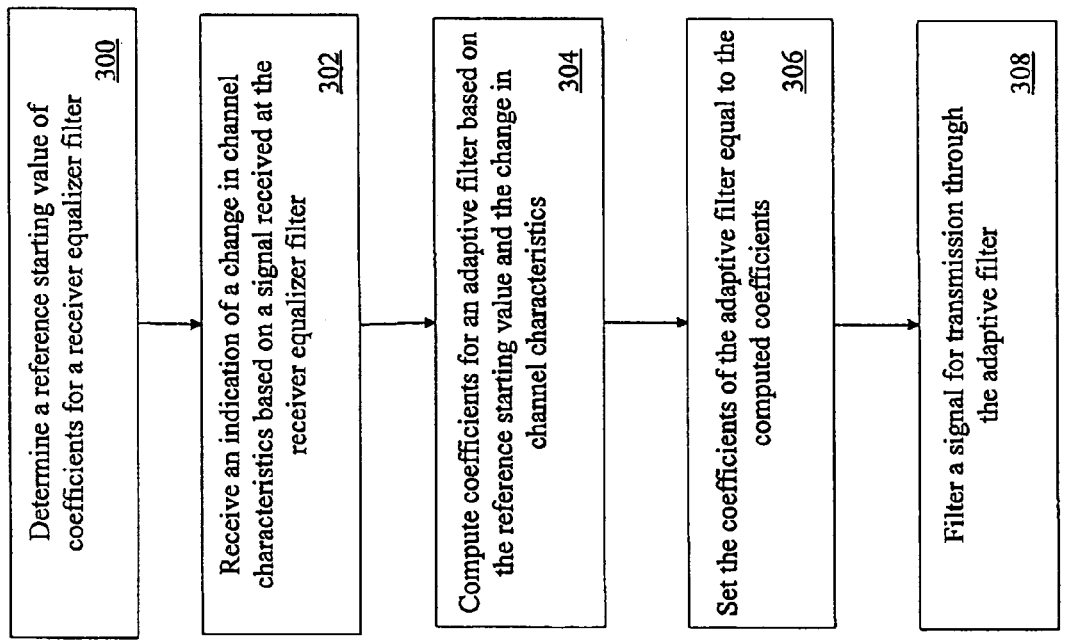
FIG. 3 is a flow diagram illustrating a method according to an embodiment of the invention.

FIG. 3 illustrates a method according to one embodiment of the invention. At 300, a reference starting value of coefficients for a receiver equalizer filter are determined. At 302, an indication of a change in channel characteristics is received. This change indication may be based on a signal received at the receiver equalizer filter. In one embodiment, the received signal is filtered through the receiver equalizer filter. At 304, coefficients for an adaptive filter are computed based on the reference starting value and the change in channel characteristics. In one embodiment, this computation involves performing a Fourier transform, such as a DFT, of the coefficients of the receiver equalizer filter. A quotient of the DFT of the coefficients of the receiver equalizer filter and the DFT of the reference starting value may then be computed. An inverse DFT of the computed quotient may then be performed.

In another embodiment, the computation of coefficients for the adaptive filter involves filtering the received signal through an inverse channel filter with coefficients equal to the reference starting value. The output of the inverse channel filter may then be filtered through a channel correction filter. The output of the receiver equalizer filter may be delayed to match the output of the channel correction filter in time. A difference between the output of the channel correction filter and the delayed output of the receiver equalizer filter may be computed. One or more coefficients of the channel correction filter may be corrected based on the computed difference. The process of computing the difference between the output of the channel correction filter and the delayed output of the receiver equalizer filter and correcting the coefficients of the channel correction filter may be performed more than once.

At 306, the coefficients of the adaptive filter are set to equal to the computed coefficients. In one embodiment, the coefficients of the adaptive filter are set to equal the inverse DFT of the computed quotient. In another embodiment, the coefficients of the adaptive filter are set to equal the corrected coefficients of the channel correction filter. At 308, the adaptive filter filters a signal for transmission.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
   a Least Means Square (LMS) filter to filter a received signal;
   a correction element to determine a change in channel characteristics based on the received signal and to set one or more coefficients of the adaptive filter to adapt to the change in channel characteristics, the correction element comprising:
      a Discrete Fourier Transform (DFT) component having an input coupled to an output of the LMS filter, the DFT component to perform a Fourier transform of coefficients of the LMS filter;
      a divider component having a first input coupled to an output of the DFT component;
      a storage component having an output coupled to a second input of the divider component, the storage component to store a reference DFT value representing a beginning DFT state of the coefficients of the LMS filter, wherein the divider component is to compute a quotient of the DFT transformed coefficients of the LMS filter and the beginning DFT state of the coefficients of the LMS filter;
      an inverse DFT component coupled to an output of the divider component, the inverse DFT component to perform an inverse Fourier transform of the quotient computed by the divider component; and
   an adaptive filter coupled to an output of the inverse DFT component, the adaptive filter to filter a signal for transmission based on the inverse Fourier transform of the quotient computed by the divider component.

2. The apparatus of claim 1, wherein the correction element to set the coefficients of the adaptive filter to adapt to the change in channel characteristics comprises the correction element to set the coefficients of the adaptive filter equal to the coefficients computed by the inverse DFT component.

* * * * *